(12) United States Patent
Andreasson

(10) Patent No.: US 6,301,983 B1
(45) Date of Patent: Oct. 16, 2001

(54) DEVICE IN LINEAR ACTUATORS

(75) Inventor: Sune Andreasson, Kristianstad (SE)

(73) Assignee: Warner Electric AB, Kristianstad (SE)

( * ) Notice: Subject to any disclaimer, the term of this patent is extended or adjusted under 35 U.S.C. 154(b) by 0 days.

(21) Appl. No.: 09/462,670

(22) PCT Filed: Jul. 9, 1997

(86) PCT No.: PCT/SE97/01249
§ 371 Date: Mar. 13, 2000
§ 102(e) Date: Mar. 13, 2000

(87) PCT Pub. No.: WO99/02897
PCT Pub. Date: Jan. 21, 1999

(51) Int. Cl.$^7$ ............................. F16H 25/20; B23B 21/00
(52) U.S. Cl. ............................................. 74/89.36; 82/141
(58) Field of Search ........................ 74/89.15, 424.8 R, 74/89.36; 82/141

(56) References Cited

U.S. PATENT DOCUMENTS

| | | | |
|---|---|---|---|
| 2,612,070 | * 9/1952 | Hoelscher | 82/141 |
| 2,885,920 | * 5/1959 | Livingston | 82/141 X |
| 3,109,335 | * 11/1963 | Gerchow | 82/141 |
| 3,728,903 | 4/1973 | Haller | 74/89.15 |
| 4,878,390 | 11/1989 | Hauser | 74/89.15 |
| 5,370,214 | 12/1994 | Katahira | 198/345.1 |
| 5,482,416 | * 1/1996 | Reko | 82/141 X |

FOREIGN PATENT DOCUMENTS 4120500  11/1992  (DE) ......................................... 25/20

* cited by examiner

*Primary Examiner*—Allan D. Herrmann
(74) *Attorney, Agent, or Firm*—Orum & Roth

(57) ABSTRACT

The invention concerns a device in linear actuators comprising a carriage (1) which is guided for movement on or in a rail by means of rotatable threaded spindle (3) extending in the longitudinal direction of the rail. The spindle runs freely through at least one screw support (2, 17, 18, 20, 21, 22, 23) which serves as a bearing supporting the spindle (3) intermediate the ends thereof. The carriage (1) and the screw support (2, 17, 18, 21, 22) are provided with interacting locking means (4, 5, 6, 7) arranged to cause said screw support (2, 17, 18, 21, 22) to be brought along by said carriage (1) during part of the movement of the latter along the spindle (3). In addition. means (11, 19, 28, 29) are provided for releasing the carriage (1) and the screw support (2, 17, 18, 21, 22) from one another as they pass said means while at the same time the secure the screw support (2, 17, 18, 21, 22) in the position into which it has been moved.

4 Claims, 5 Drawing Sheets

US 6,301,983 B1

DEVICE IN LINEAR ACTUATORS

BACKGROUND OF THE INVENTION

The present invention relates to a device in linear actuators of the kind comprising an open rail or a hollow profile rail on or in, as the case may be, a carriage is guided for displacement in the longitudinal direction of the rail with the aid of a rotatable threaded spindle in screw engagement with the carriage.

More precisely, the invention concerns a device in linear actuators of the kind in which a screw support is provided at least to one side of the carriage, said screw support arranged to form a bearing supporting the spindle intermediate the points of support at the spindle ends.

A screw support of this kind is intended to prevent the threaded spindle, usually a ball bearing screw, from bending or deflecting outwards upon attainment of a so called critical r.p.m. value. Such outwards deflection depends on the length and rotational speed of the spindle. This critical value is attained at an earlier stage when the spindle is of a particularly great length and/or the rotational speed is high than in the case of short spindles or lower rotational speeds.

In linear actuators of considerable length, formed with a long spindle that operates at comparatively high r.p.m. values, it is possible to prevent the above-mentioned outwards deflection of the spindle by using one or several support bearings in the form of such screw supports. In order to allow carriage movements from one end of the linear actuator to the other, various technical solutions have been suggested to make the carriage bring along, in its movements, a screw support from a selected point of support positioned along the length of the spindle and then, upon its return movement, release and leave the screw support at the same point of support. Hitherto known locking means for interconnecting carriage and screw supports have, however, suffered from the disadvantage of being unnecessarily complicated, in addition to which they have been subjected to unnecessarily heavy wear during the translatory movements of the screw support by means of the carriage, often resulting in unsatisfactory operational reliability in the linear actuator. Generally, the space requirements of the locking means on one or both sides of the linear actuator are such that there is a risk that the screw support gets wedged on equipment disposed close to the linear actuator, a situation which likewise impairs the operational reliability of the linear actuator and which consequently may lead to breakdowns.

The invention provides a device by means of which screw supports may be brought along by the moving carriage and be secured in pre-determined places disposed along the spindle, which device is of simple structure, requires a minimum of space while at the same time it exposes the components of the device to a minimum of wear, in consequence whereof the device is imparted a considerable degree of operational reliability. The features characterizing the device in accordance with the invention appear from the appended claims.

BRIEF SUMMARY OF THE INVENTION

The invention will be described in closer detail in the following with reference to the accompanying drawings, wherein:

BRIEF DESCRIPTION OF THE SEVERAL VIEWS OF THE DRAWINGS

FIG. 1 illustrates a part of a carriage 1 and a screw support 2. The carriage 1 is in screw engagement with a threaded spindle 3, which for improved clarity is not illustrated in FIG. 1 but only in FIGS. 7 and 8. The spindle 3 runs freely through the screw support 2, the latter intended to serve as a bearing to support the spindle 3. The carriage 1 and the screw support 2 are arranged for movement in a hollow profile rail, which has been deleted from the Figure, likewise for improved clarity.

DETAILED DESCRIPTION OF THE INVENTION

Figure 1:
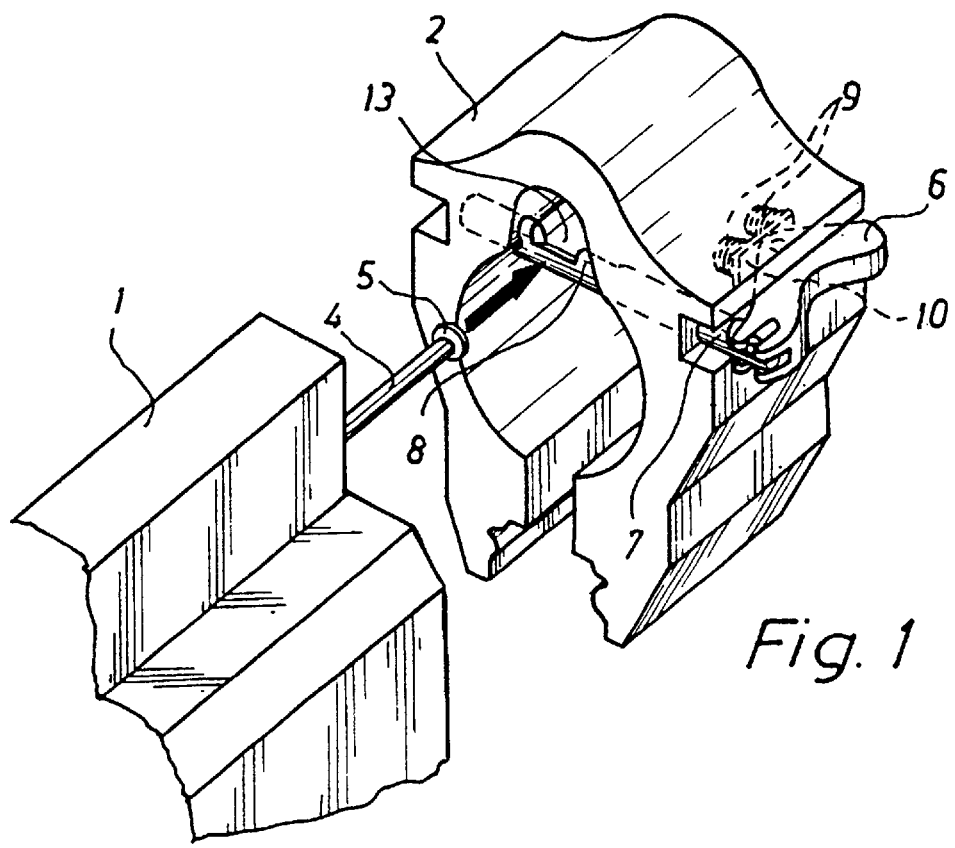
FIG. 1 is a perspective view of a screw support and a part of a carriage, shown separated from one another and provided with locking means devised in conformity with one embodiment of the invention.

The carriage 1 and the screw support 2 are provided with interacting locking means. The locking means of the carriage consist, in accordance with one embodiment of the invention, of a connecting rod 4 projecting from the carriage 1 in the longitudinal direction of the spindle 3 and supporting a locking washer 5 at its free end. In accordance with this embodiment, the locking means of the screw support 2 consists of a rocker arm 6 which is located to one side of the screw support 2 and which is pivotally connected to a blocking arm 7, said latter arm being displaceable in its longitudinal direction transversely of the screw support 2 and formed with a stop portion 8. By means of a pair of compression springs 9, each urging a plate 10 into abutment against the rocker arm 6, the latter tends to assume one of its end positions, i.e. either an open position or a locked position.

Figure 2:
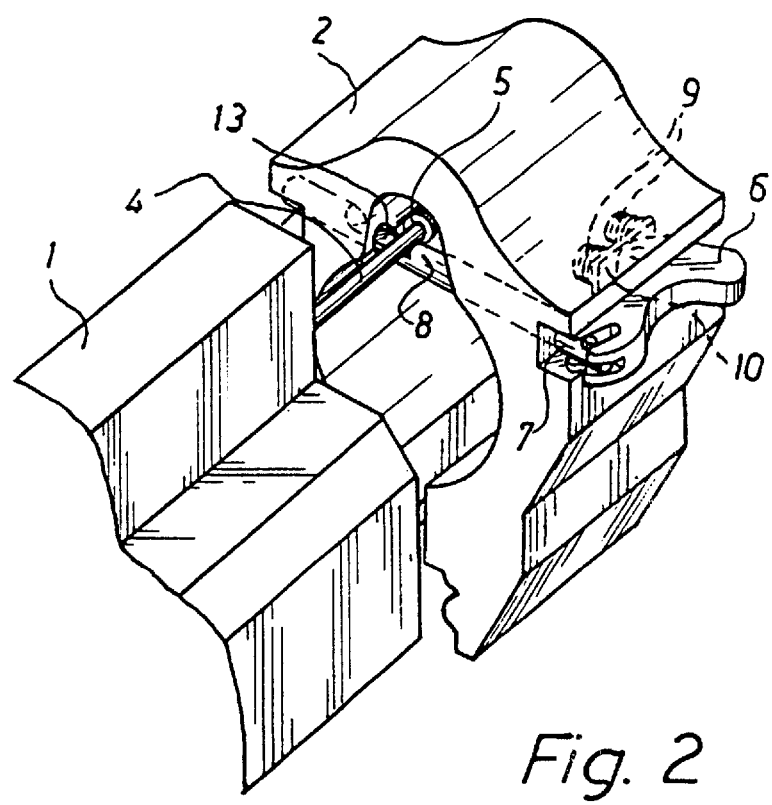
FIG. 2 is a similar view of these parts, shown in locked position.
Figure 3:
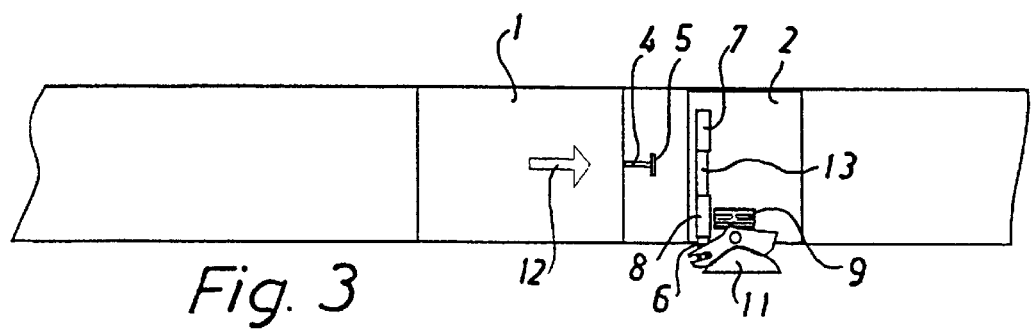
FIGS. 3–6 are schematic views illustrating the function of the locking means.
Figure 4:
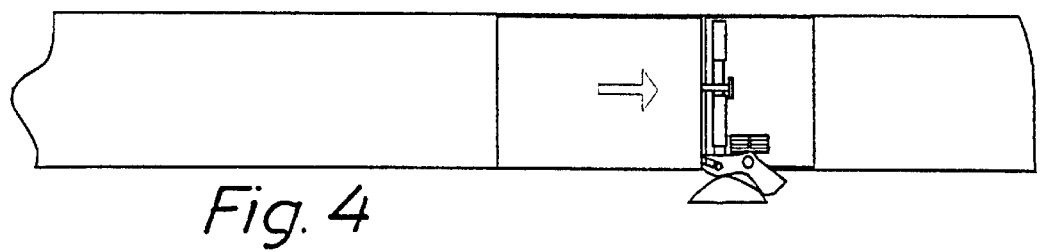

The function of the locking means will be explained in the following with reference to FIGS. 3–6. FIG. 3 illustrates a position, wherein the screw support 2 is kept fixed with the aid of stationary abutment 11 positioned laterally of the path of movement of the carriage 1. In this case, the rocker arm 6 and the blocking arm 7 are kept in the open position. The carriage 1 is being displaced in the direction of arrow 12 and thus approaches the screw support 2. When the carriage 1 reaches the screw support 2, see FIG. 4, the locking washer 5 passes through a notch 13 formed in the blocking arm 7, see also FIGS. 1 and 2. When the carriage henceforth carries along the screw support 2 as it continues moving in the same direction, the stationary abutment 11 forces the rocker arm 6 to shift from its open to its locking position. Consequently, the stop portion 8 on the locking arm 7 will assume a position behind the locking washer 5 as seen in the direction of movement. In this manner, the carriage 1 and the screw support 2 become interlocked.

Figure 5:
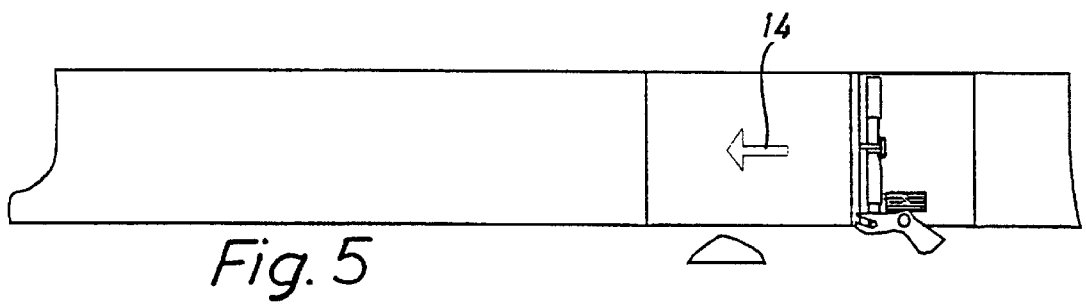
Figure 6:
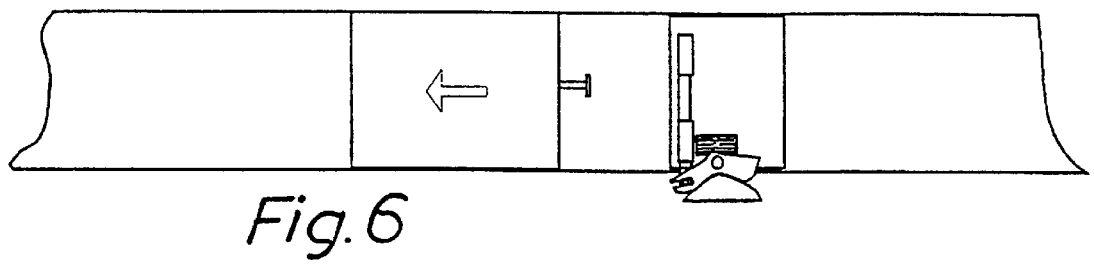

When, while assuming an end position on the linear actuator, the carriage 1 reverses and is advanced in the direction of arrow 14, see FIG. 5, it consequently carries the screw support 2 along in its reverse movement, by means of the connecting rod 4 and the locking washer 5. As soon as the carriage 1 together with the screw support 2 again passes the abutment 11, see FIG. 6, their passage forces the rocker arm 6 to rock back to the open position. The locking washer 5 is again able to pass through the notch 13 and the carriage 1 to continue its movement in the direction of arrow 14, whereas the screw support 2 is held by the abutment 11 and when in its thus fixed position it forms a bearing support on which the spindle 3 is supported until the carriage again reverses its movement and the process just described is repeated.

Figure 7:
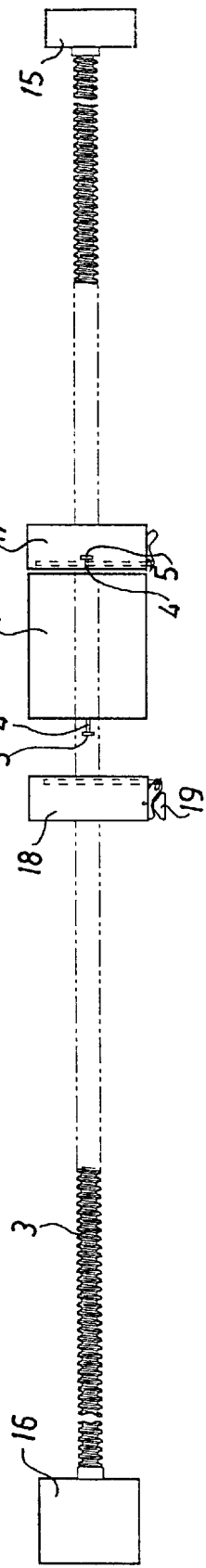
FIG. 7 is a broken view from above of the spindle incorporated in the linear actuator, also schematically showing the carriage having one screw support on either side.
Figure 8:
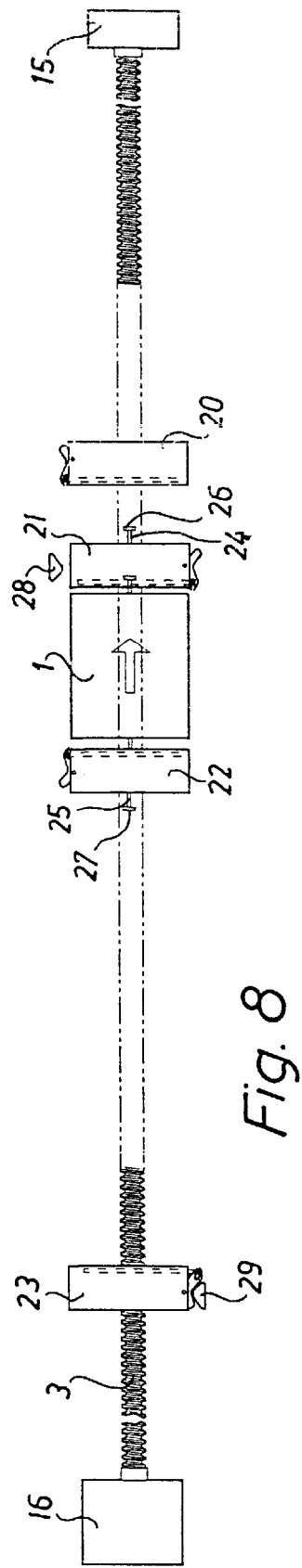
FIG. 8 is a view similar to FIG. 7 but showing the carriage having one couple of screw supports on either side.

The function of the device in accordance with the invention has been explained above by description of the cooperation of the carriage 1 with one screw support 2 only. FIGS. 7 and 8, on the other hand, illustrate embodiments that are suitable for practical applications. Thus, FIG. 7 shows the spindle 3, extending between the bearing points 15, 16 disposed at the spindle ends, as also the carriage 1, including two screw supports 17, 18, one on either side. In this case the carriage 1 likewise is formed on either side with a connecting rod 4 supporting a locking washer 5 thereon. One single stationary abutment 19, preferably centrally located on the spindle 3, cooperates with both screw supports 17, 18. One of the screw supports, screw support 18 in the position shown in FIG. 7, is always secured to the abutment 19 whereas the other screw support, in the present case screw support 17, is brought along by the carriage 1. As the moving carriage comes into contact with the screw support 18, the latter is released from the abutment 19, and as soon as the carriage 1 has passed the abutment 19, the screw support 17 is caught by the abutment, is released from the carriage 1 and fixed whereas the carriage 1 continues its movement, displacing screw support 18 ahead of itself. In each position of the carriage 1 along the spindle 3 the latter thus has a support bearing located centrally thereon, preventing the spindle from deflecting outwards.

In the case of long spindles it may be suitable to use one pair of screw supports 20, 21 and 22, 23, respectively, on either side of the carriage 1, as shown in FIG. 8. Like the carriage 1, the screw supports 21 and 22 closest to the carriage 1 are then provided with connecting rods 24 and 25, respectively, and locking washers 26 and 27, respectively. According to this embodiment abutments 28 and 29, are provided, one on either side of the spindle 3.

Figure 9:
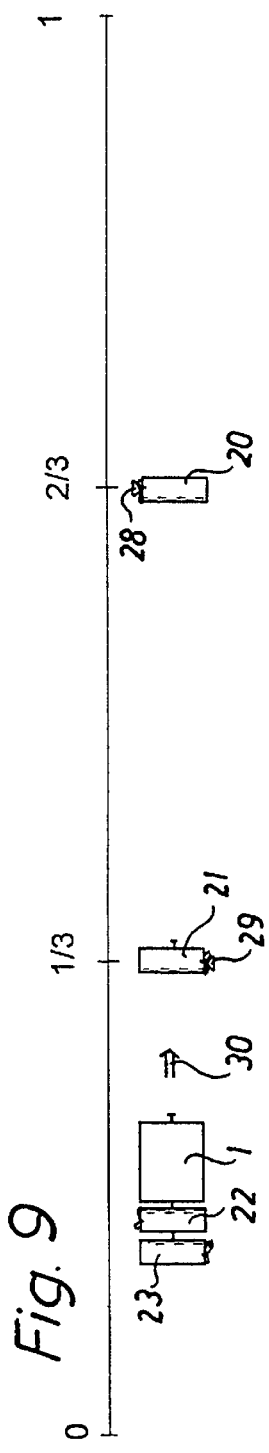
FIGS. 9–11 illustrate the carriage and the screw supports in accordance with FIG. 8 in different positions.
Figure 10:
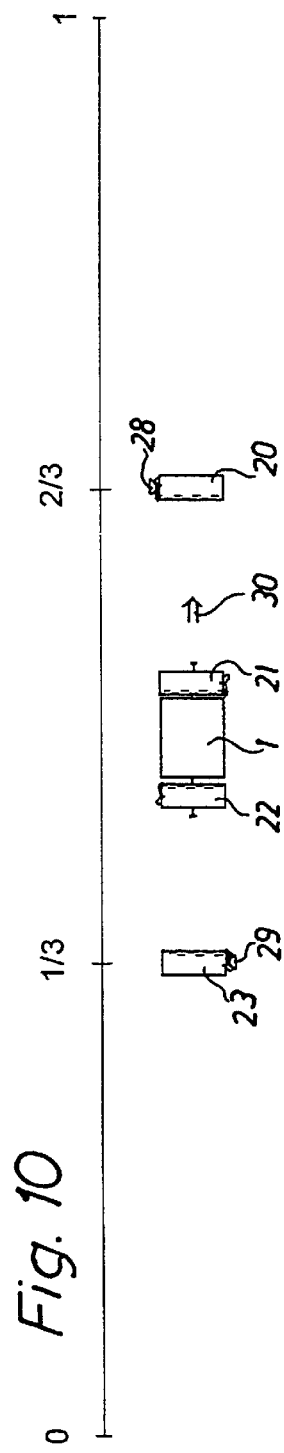
Figure 11:
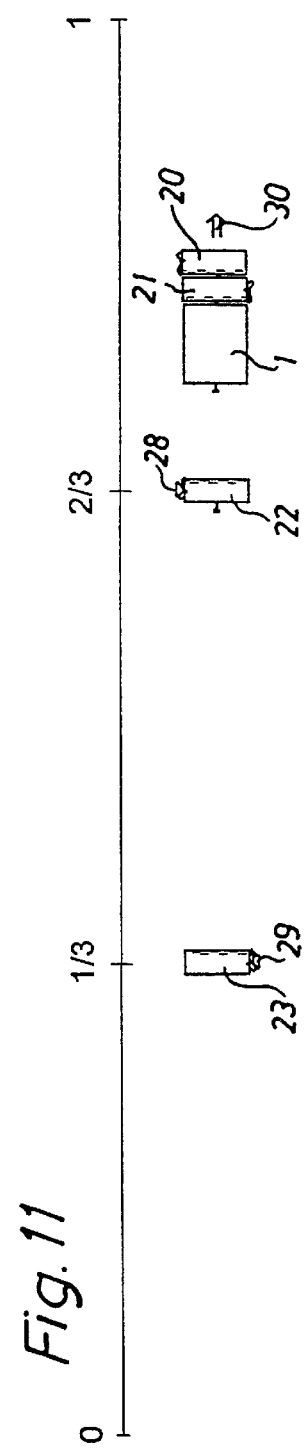

In order to describe the functional process in the simplest possible way with respect to the embodiment of FIG. 8, reference is now made to FIGS. 9–11. The spindle 3 is imagined divided into three thirds, the abutments 28, 29 being disposed at a distance from the respective spindle end corresponding to one third of the length of the spindle 3.

In accordance with FIG. 9 the carriage 1 is in a position to the left as seen in that Figure and it is assumed that it moves to the right, in the direction of arrow 30. In this situation, the carriage 1 brings along the screw support 22 in its movement, said support in turn bringing along screw support 23. When the carriage 1 reaches the screw support 21, the latter is released from its engagement with the abutment 29 while at the same time it is interconnected with the carriage 1, the screw support 22 passes freely past the abutment 29 whereas the screw support 23 is released from screw support 22 and is secured to the abutment 29. The carriage 1 continues its movement in the manner shown in FIG. 10, i.e. with one screw support 21 ahead and one screw support 22 at the rear. When the carriage 1 reaches the abutment 28 the screw support 20 is released (therefrom) in a corresponding manner while at the same time it is locked to the screw support 21, this screw support passes freely past the abutment 28 and the screw support 22 is released from the carriage 1 and is secured to the abutment 28. As apparent from FIG. 11, the carriage 1 then continues its movement, bringing along with it, at its front, screw supports 20, 21 while screw supports 22 and 23 are secured to the abutments 28 and 29, respectively, each support thus forming a bearing supporting the spindle 3 at its respective place.

Figure 12:
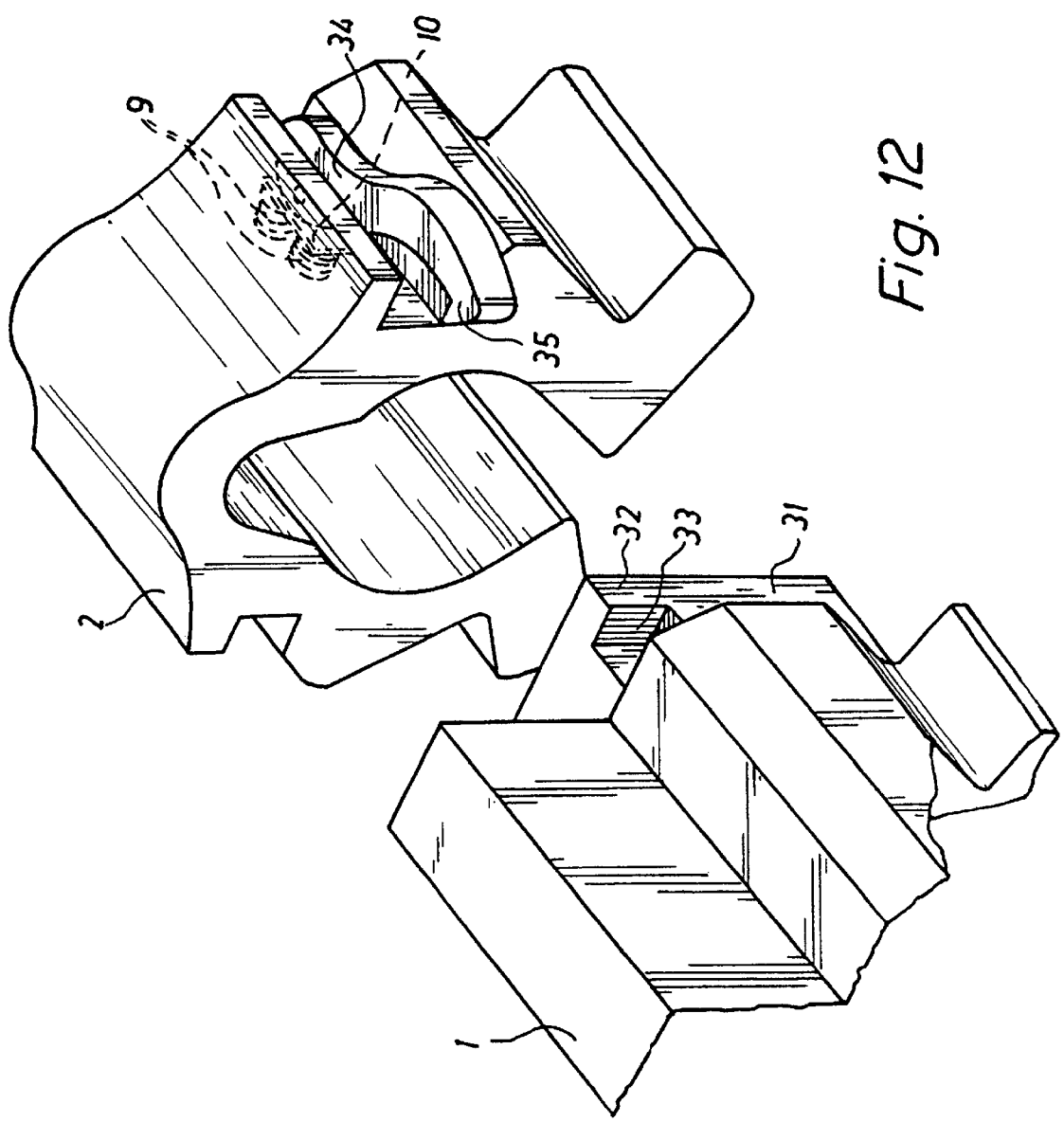
FIG. 12 is a view similar to FIG. 1 of the carriage and a screw support but fitted with locking means in accordance with a different embodiment.

In FIG. 12, the carriage 1 and the screw support 2 are shown with differently configured locking means. In this case, the carriage 1 is formed with a plate 31 having a recess therein forming an edge portion 32 including a rear edge face 33 that is turned away from the screw support 2. The screw support 2 is provided with a rocker arm 34 which in the same manner as the rocker arm 6 in FIGS. 1 and 2 is spring-biased by spring means 9 urging a plate 10 into abutment against the rocker arm 34. In contrast to the rocker arm 6 the rocker arm 34 is formed with a hook member 35 which, when actuated by the spring means 9, snaps behind said rear edge face 33 in order to interconnect the carriage 1 and the screw support 2. The rocker arm 34 otherwise cooperates with a stationary abutment located laterally of the linear actuator, in the same manner as rocker arm 6.

The invention is not limited to the embodiments described and shown but may be varied in many ways within the scope of the appended claims. For instance, the carriage 1 in accordance with the embodiment of FIG. 12 need not be provided with a plate 31 but instead the wall thereof could be formed with a recess forming a corresponding rear edge face for engagement with the hook member 35. Instead of a recess, the blocking arm 7 could have a protruding (depressed) portion which is introduced behind the locking washer 5 after the latter has passed above (underneath) the blocking arm 7.

The invention is not either limited to the described embodiments including one, two, or four screw supports, but the device could equally well operate with a larger number of screw supports, such as e.g. six such supports.

What is claimed is:

1. A device in linear actuators comprising
   a carriage 1, guided for displacement in the longitudinal direction of a rotatable threaded spindle (3) in screw engagement with the carriage (1),
   said spindle extending freely through a screw support (2, 17, 18, 20, 21, 22, 23), at least at one side of the carriage (1),
   said screw support arranged to serve as a bearing supporting the spindle (3) between points of support (15, 16) located at the ends of the spindle (3), the carriage (1) and the screw support (2, 17, 18, 21, 22) are provided with interacting locking means (4, 5, 6, 7, 8) arranged, for the purpose of interconnecting the carriage (1) and the screw support (2, 17, 18, 20, 21, 22,) to interengage as soon as the carriage (1), while being moved in response to the rotation of the spindle (3), reaches the screw support (2, 17, 18, 21, 22) and starts bringing along said support in its movement, and in that means (11, 19, 28, 29) being arranged, upon reverse movement of said carriage (1) and said screw support while in their interconnected condition, to release said carriage (1) from said screw support (2, 17, 18, 21, 22) as said carriage and support pass said means (11, 19, 28, 29) and at the same time to secure said screw support in the position it has attained by having been thus displaced by the carriage,
   the locking means of the carriage (1) consists of a connecting rod (4) projecting from the carriage (1) in the longitudinal direction of the spindle (3) and supporting a locking washer (5) at its free end, and in that the locking means of the screw support (2, 17, 18, 20, 21, 22, 23) consists of a rocker arm (6) which is located at one side of the screw support and which is pivotally connected to a blocking arm (7), said arm being displaceable in its longitudinal direction transversely of the screw support (2, 17, 18, 20, 21, 22, 23) and being formed with a stop portion (8), in that the locking washer (5) of the connecting rod (4) is arranged, for the purpose of interconnecting the carriage (1) and the screw support, to move past the stop portion (8) of the blocking arm (7) upon movement of said carriage (1) to a position adjacent said screw support, and in that said rocker arm (6) is arranged, upon the continued movement of the carriage (1) and the screw support (2, 17, 18, 20, 21, 22, 23) in the same direction, to displace the blocking arm (7) in the longitudinal direction thereof to a position in which said stop portion (8) is caught behind the locking washer (5), as seen in the direction of movement.

2. A device as claimed in claim 1, wherein an abutment (11, 19, 28, 29) disposed laterally of the path of movement of said carriage (1) and cooperating with said rocker arm (6) said abutment arranged, as said carriage (1) moves into abutment arranged, as said carriage (1) moves into abutment against the screw support (2, 17, 18, 20, 21, 22, 23) and brings along said screw support in its movement, to cause said rocker arm (6) to displace the stop portion (8) of said blocking arm (7) into locking position behind the locking washer (5) and upon movement jointly of said carriage (1) and said screw support in the opposite direction and their moving past said abutment (11, 19, 28–29), to cause said rocker arm (6) to displace the blocking arm (7) to the release position, i.e. to a position enabling the locking washer (5) to pass past the stop portion (8) in order to release the carriage (1) from the screw support (2, 17, 18, 20, 21, 22, 23) while at the same time it holds the screw support via the rocker arm (6, 34) and serves as a stop means preventing further movement thereof.

3. A device in linear actuators comprising a carriage 1, guided for displacement in the longitudinal direction of a rotatable threaded spindle (3) in screw engagement with the carriage (1), said spindle extending freely through a screw support (2, 17, 18, 20, 21, 22, 23), at least at one side of the carriage (1), said screw support arranged to serve as a bearing supporting the spindle (3) between points of support (15, 16) located at the ends of the spindle (3), the carriage (1) and the screw support (2, 17, 18, 21, 22) being provided with interacting locking means (4, 5, 6, 7, 8) arranged, for the purpose of interconnecting the carriage (1) and the screw support (2, 17, 18, 21, 22), to interengage as soon as the carriage (1), while being moved in response to the rotation of the spindle (3), reaches the screw support (2, 17, 18, 21, 22) and starts bringing along said support in its movement, and means (11, 19, 28, 29) being arranged, upon reverse movement of said carriage (1) and said screw support (2, 17, 18, 21, 22) while in their interconnected condition, to release said carriage (1) from said screw support (2, 17, 28, 21, 22) as said carriage and support pass said means (11, 19, 28, 29) and at the same time to secure said screw support in the position it has attained by having been thus displaced by the carriage, the locking means of the carriage (1) is formed by an edge portion (32) having a rear edge face (33) which is turned away from the screw support (2), and in that the screw support (2) is provided with a rocker arm (34) including a hook member (35) which is arranged in response to spring actuation to snap into position behind said rear edge face (33) for holding the carriage (1) and the screw support (2) together.

4. A device as claimed in claim 3, wherein on the carriage side facing the screw support (2) the carriage (1) is formed with a plate (31) having an edge portion (32) comprising said rear edge face (33).

\* \* \* \* \*